Oct. 28, 1947. H. E. SMITH 2,429,777
POULTRY FEEDER
Filed Dec. 21, 1944 2 Sheets-Sheet 1
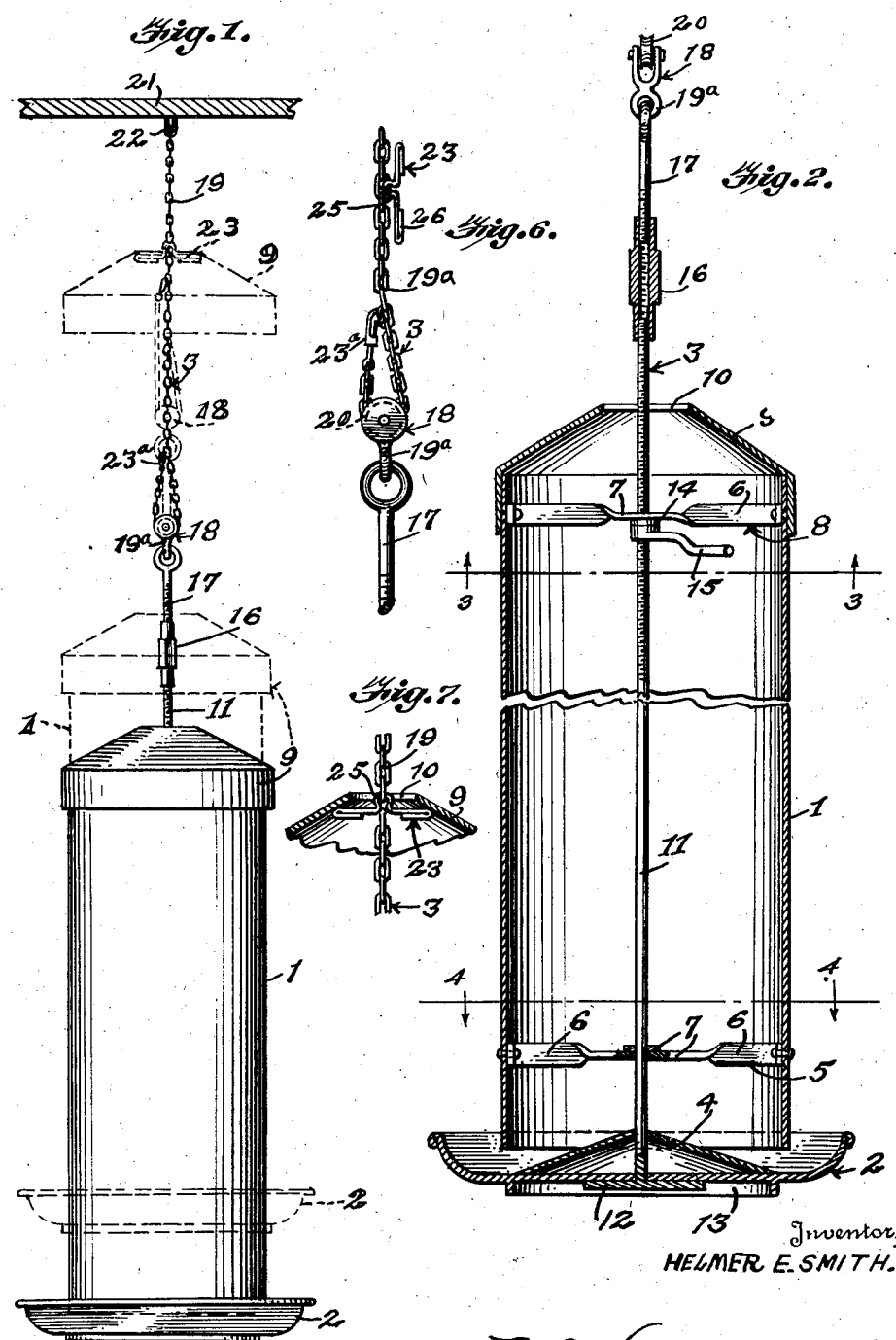
Inventor,
HELMER E. SMITH.

Oct. 28, 1947. H. E. SMITH 2,429,777
POULTRY FEEDER
Filed Dec. 21, 1944 2 Sheets-Sheet 2
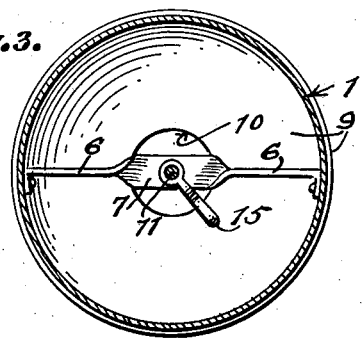
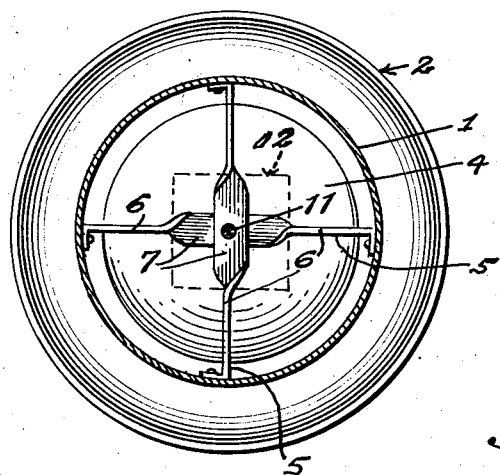
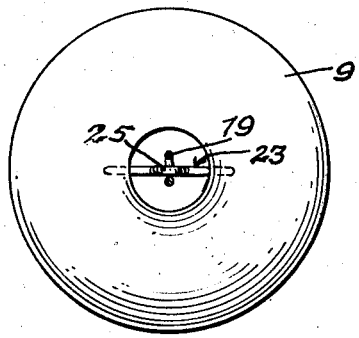
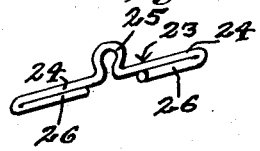
Inventor,
HELMER E. SMITH.
By E. E. Vrooman & Co.,
His Attorneys.

Patented Oct. 28, 1947

2,429,777

UNITED STATES PATENT OFFICE 2,429,777

POULTRY FEEDER

Helmer E. Smith, Sheldon, Iowa

Application December 21, 1944, Serial No. 569,183

1 Claim. (Cl. 119—53)

This invention relates to a poultry feeder.

An object of this invention is to provide a feeder that is adjustable, to automatically feed all types of home-grown grain, as well as all types of commercial feeds.

Another object is the production of a feeder which can be adjusted from one-half inch or less, above the floor of the poultry house, to a height of three feet; therefore, it can be used for feeding baby chicks on the lower adjustment and can be adjusted to the height required for feeding full-grown turkeys or any other type of poultry which will come in between these two extremes.

It is to be understood that gravity of the feed placed in the casing or cylinder, forces the feed to the outer edge of the feeding pan and will automatically feed until the entire amount of feed has been consumed by the poultry.

By feeding feed through this automatic feeder, the feed is kept clean; the poultry has access to feed of the various types at all times and by having a number of feeders, poultry will be able to have cafeteria feeding and will choose the type of feed which their bodies require.

The casing or cylinder of this feeder will hold approximately one hundred pounds of feed and will save considerable labor and also feed, instead of feeding by hand or in troughs.

Another advantage of this feeder is that it cannot be upset or tipped over, for it hangs from the ceiling or rafters of the poultry house. Another advantage is that it does not take up any floor space, which makes cleaning of the hen house much easier. This feeder is so constructed that it is impossible for poultry to roost on it.

With the foregoing and other objects in view, my invention comprises certain novel constructions, combinations and arrangements of parts as will be hereinafter fully described, illustrated in the accompanying drawings, and more particularly pointed out in the appended claim.

In the drawings:

Fig. 1 is a view in elevation of an apparatus constructed in accordance with the present invention.

Fig. 2 is an enlarged vertical, sectional view of the apparatus.

Fig. 3 is a horizontal, sectional view taken on line 3—3, Fig. 2, and looking in the direction of the arrows.

Fig. 4 is a horizontal sectional view taken on line 4—4, Fig. 2, and looking in the direction of the arrows.

Fig. 5 is a top plan view of the cover, showing the cover holder in place.

Fig. 6 is an enlarged fragmentary view, in elevation, of the suspending means.

Fig. 7 is a fragmentary view, in elevation, of the suspending means, including the cover holder and showing in section a portion of the cover.

Fig. 8 is a perspective view of the cover holder.

Referring to the drawings, in which I have shown the preferred embodiment of my invention, I designates a cylinder or casing, and 2 is the feeding pan, while 3 designates the suspending means. The pan 2 is provided with a concavo-convex bottom or lining 4, whereby feed in casing I is automatically directed to the outer portion of pan 2, where it is readily accessible to the poultry.

The casing I is provided with a pair of crossed lower brackets 5; each of these brackets has outer vertical portions 6 and a flat central portion 7. An upper bracket 8 is similarly constructed to brackets 5. A cover 9 is removably positioned upon casing I. This cover 9 is provided with a comparatively large opening 10 for the purpose hereinafter specified.

A vertical rod 11 extends through the flat portions of brackets 5 and 8, and integral with the lower end of rod 11 is plate 12. This plate 12 is nested in the hollow portion 13 of pan 2. The upper portion of the rod 11 is externally screw-threaded. A washer 14 is on rod 11 against the under face of bracket 8. A handle nut 15 is threaded on rod 11 against washer 14 (Fig. 2), whereby when the handle nut is rotated upon rod 12 vertical adjustment of casing I is obtained, for moving its lower end higher up or lower down, with respect to the pan 2, for controlling the amount of feed flowing from casing I to the pan 2, for feeding the poultry.

The suspending means 3 not only includes the rod 11 but also a turnbuckle 16, an eye bolt 17, a pulley block 18, and chain 19. The turnbuckle 16 is threaded at its lower end upon the upper end of rod 11, while the lower end of eye bolt 17 is threaded into the upper end of turnbuckle 16. The pulley block 18 is provided at its lower end with an eye 19a and in its upper end is a pulley 20, over which chain 19 is adapted to pass. The upper end of chain 19 is preferably secured to the ceiling or rafters of the poultry house in any suitable manner, for instance, by means of staple 22 (Fig. 1). The suspending means also includes the cover holder 23, for suspending the cover 9 in an open or raised position. This cover holder comprises two arms 24, arranged in horizontal alignment; it has an eye 25 and two inwardly extending portions 26, which portions 26 are parallel with the arms 24 for bracing or reinforcing said arms. The eye 25 has sufficient resiliency to snap on one of the links of chain 19. In other words, the cover holder can be easily placed on chain 19, or when the operator desires, it can be easily removed therefrom. The cover holder can be easily moved to a vertical position, as shown in Fig. 6, to allow it to pass through opening 10 of the cover 9, when it is desired to place the cover in an open position as clearly shown in dotted lines in Fig. 1.

The chain 19 is passed around the pulley 20 (Fig. 6) and by means of a snap buckle 23ª the chain is held in an adjusted position, whereby the operator can position the apparatus the desired position above the floor of the poultry house.

By reason of the adjustability of the casting 1 upon rod 11, and the adjustment obtained at the turnbuckle 16, together with the adjustment of the chain by reason of snap buckle 23, the entire apparatus is very efficient, inasmuch as the quantity of feed being fed to the poultry is accurately controlled, together with the position of the apparatus above the floor of the poultry house.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claim.

What I claim is:

In a poultry feeder, the combination of a casing provided near its bottom with a pair of cross brackets, and near its top with a single bracket, each of said brackets having vertically positioned ends and a horizontal central portion, a vertical rod extending through the central horizontal portions of said brackets, said rod provided on its lower end with an integral plate, a feeding pan resting on said plate and positioned beneath the lower end of said casing, a washer against the lower face of said upper bracket, a manually operated handle nut threaded on said rod against said washer, a cover on said casing, said cover provided with a comparatively large central opening, a turn buckle on the upper end of said rod, an eye bolt threaded into said turn buckle, a pulley block on said eye bolt, said pulley block provided with a pulley, a chain over a portion of said pulley, a cover holder on said chain and being adapted to pass through the opening of said cover, and said chain provided with a snap buckle at its inner end for engaging a link of said chain.

HELMER E. SMITH.

REFERENCES CITED

The following references are of record in the file of this patent:

UNITED STATES PATENTS

| Number | Name | Date |
|---|---|---|
| 40,625 | Jerome | Nov. 17, 1863 |
| 331,564 | Sloan | Dec. 1, 1885 |
| 846,175 | Xevers | Mar. 5, 1907 |
| 907,227 | Eaton | Dec. 22, 1908 |
| 1,217,438 | Gallagher | Feb. 27, 1917 |
| 1,891,042 | Benoit | Dec. 13, 1932 |
| 1,913,810 | Lannes | June 13, 1933 |
| 2,344,367 | Pueschel | Mar. 14, 1944 |

FOREIGN PATENTS

| Number | Country | Date |
|---|---|---|
| 11,426 | Great Britain | 1895 |
| 248,910 | Great Britain | Mar. 18, 1926 |